Feb. 3, 1959 P. E. GELDHOF 2,871,688
UNIT DRIVE FOR COMBINED WASHER AND DRYER
Filed Dec. 14, 1953 2 Sheets-Sheet 1
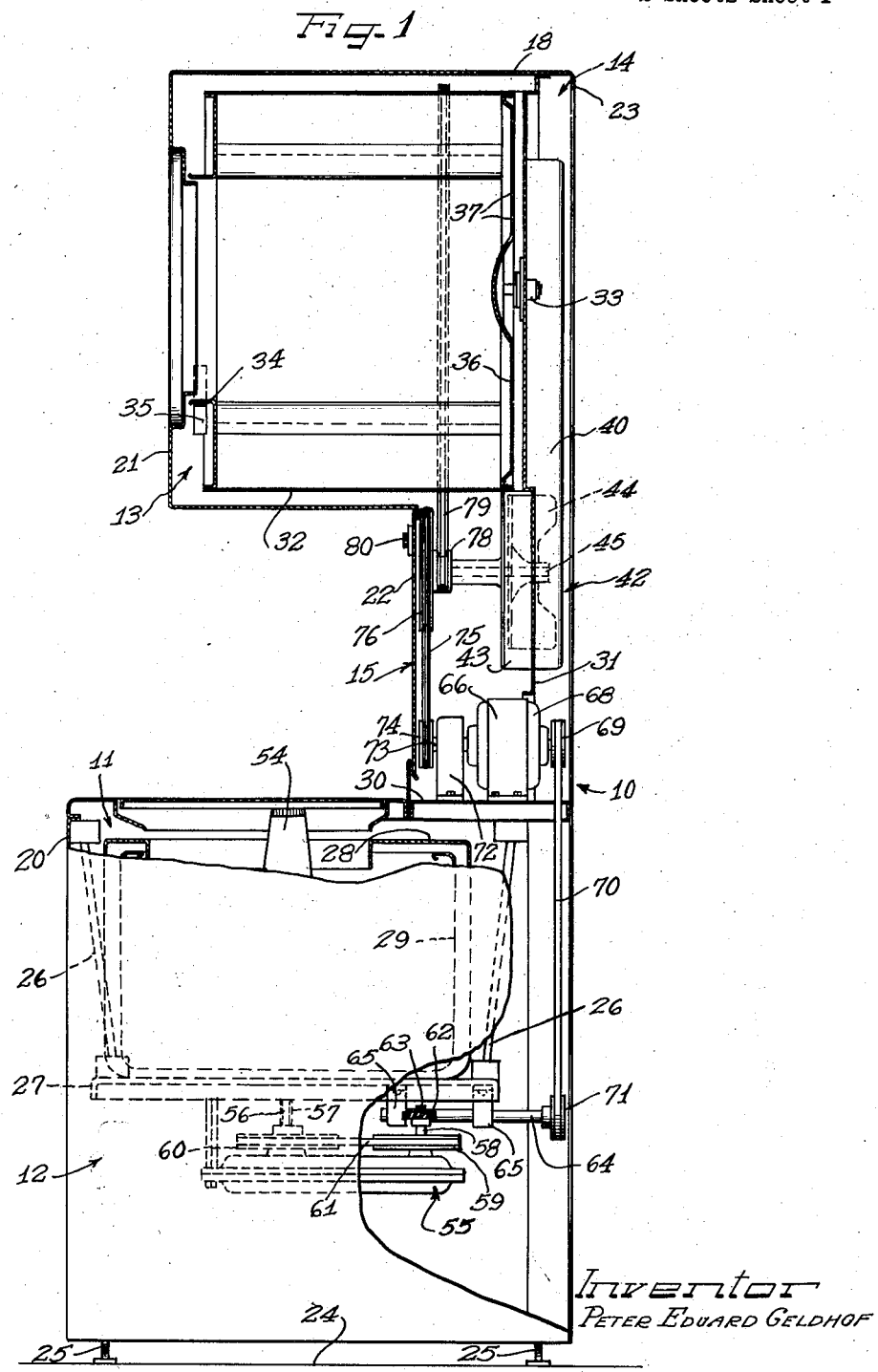
Inventor
PETER EDUARD GELDHOF
by Hill, Sherman, Meroni, Gross & Simpson Attys.

Feb. 3, 1959   P. E. GELDHOF   2,871,688
UNIT DRIVE FOR COMBINED WASHER AND DRYER
Filed Dec. 14, 1953   2 Sheets-Sheet 2
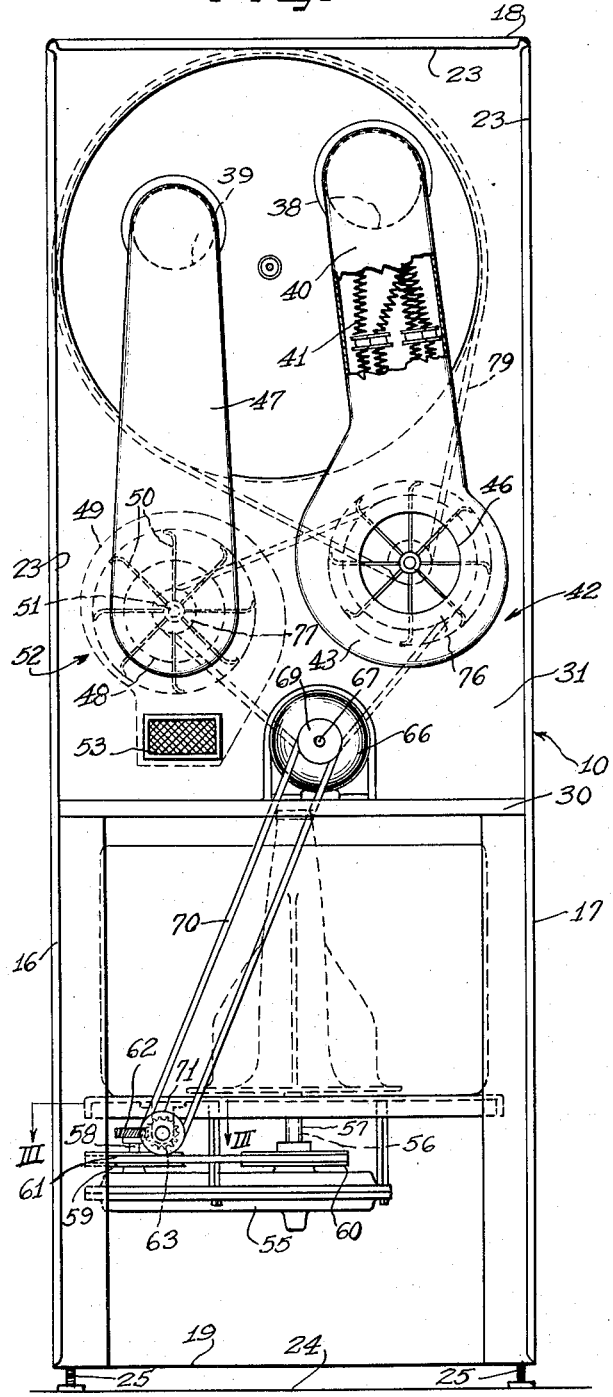
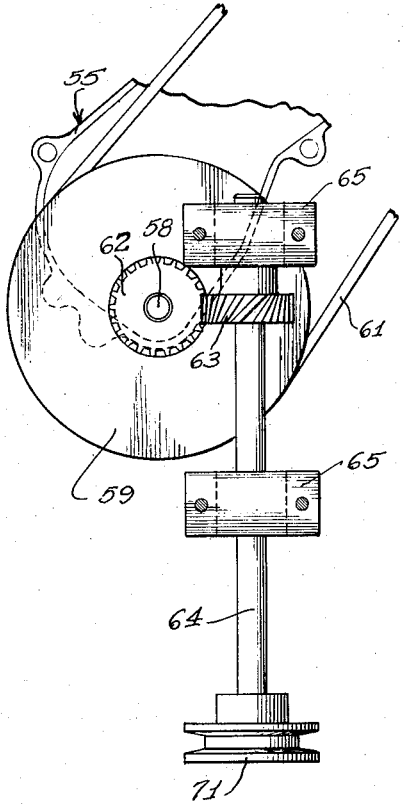
Inventor
PETER EDUARD GELDHOF
by Hill, Sherman, Meroni, Gross & Simpson
Attys.

United States Patent Office 2,871,688
Patented Feb. 3, 1959

2,871,688

UNIT DRIVE FOR COMBINED WASHER AND DRYER

Peter Eduard Geldhof, Benton Harbor, Mich., assignor, by mesne assignments, to Whirlpool Corporation, a corporation of Delaware Application December 14, 1953, Serial No. 398,068

7 Claims. (Cl. 68—19)

The present invention relates to a laundering equipment and more particularly to a drive mechanism and arrangement for a combined clothes washer and dryer.

In accordance with the principles of the present invention a combination washing and drying machine may be provided with a driving power from a single prime mover source thereby to effect a greater economy of construction as well as greater economy of operation without sacrificing construction, manufacturing and operational quality of the mechanism. Through the utilization of a single unit drive for a combined washer and dryer a more efficient combination machine may be constructed which obviates many of the problems heretofore attending manufacturing and operation of devices of this class.

Combined washers and dryers powered and driven in accordance with the principles of the present invention are provided with a single prime mover such as an electric motor or the like which may be conveniently incorporated into the machine and coupled to the drive control for the washer and to the drum of the dryer as well as to the air blowers for the dryer to selectively drive these portions of the combination unit or to drive them simultaneously.

It is, therefore, an important object of the present invention to provide a new and improved drive system for a combination washer and dryer.

Another object of the present invention is to provide a new and improved drive system for a combined washer and dryer wherein the washer and dryer are coordinated and arranged to be driven by a single mechanical source so connected thereto that the washer and dryer may be driven selectively or simultaneously.

Still another object of the present invention is to provide a new and improved combination washer and dryer wherein the moving parts are driven by a single power source.

Still another object of the present invention is to provide a new and improved combination washer and dryer wherein the dryer is spaced from the washer by a drive and control compartment housing a single source of power for both the washer and dryer which is so coupled to the washer and dryer as to drive the same simultaneously or selectively.

Still other objects, features and advantages of the present invention, in addition to those recited above, will become readily apparent from the following detailed description of the principles of the present invention and a preferred embodiment thereof, from the claims, and from the drawings in which each and every detail shown and illustrated is fully and completely disclosed as a part of this specification, in which like reference numerals refer to like parts, and in which:

Figure 1 is a side view of a combined washer and dryer incorporating the principles of the present invention and shown partially in elevation and partially in section, with the section being substantially a vertical central section;

Figure 2 is a back side elevational view of the combined washer and dryer of Figure 1; and, Figure 3 is a sectional view taken substantially along the line III—III of Figure 2.

A preferred form of combined washer and dryer for incorporation of the principles of the present invention is illustrated at 10 in Figures 1 and 2 as including a washer unit 11 housed within a washer compartment 12 and a dryer unit 13 housed within a dryer compartment 14 which is preferably vertically spaced from the washer compartment 12 with a drive and blower and control compartment 15 lying between the dryer compartment 14 and the washer compartment 12. The exterior of the structure of the combined washer and dryer 10 includes side wall panels 16 and 17 secured to a top cover panel 18 and a base plate or the like 19 and carrying front panels 20, 21 and 22 on the washer compartment, dryer compartment, and drive compartments respectively. In addition the side wall panels 16 and 17 and the top cover panel 18 are flanged as at 23—23—23 along their rearward edges respectively for securing a rear cover panel or the like thereto, and which has been removed from Figures 1 and 2 to more clearly illustrate the numerous other features of the invention. The entire housing and structure is supported above the floor or the like as indicated by the line 24, by adjustable legs 25 which may be adjusted to level the machine for proper operating orientation thereof.

The washer unit 11 is preferably suspended within the washer compartment 12 by resiliently mounted suspension rods and the like 26 which support a washer carrying plate 27 carrying the stub 28 and extractor 29 in the manner as set forth in the United States Letters Patent No. 2,521,159, issued September 5, 1950 to P. E. Geldhof et al.

Each of the suspension rods 26 is resiliently associated at its upper end with the upper cover of the washer compartment except at the rearward extremity thereof where a rod 26 is resiliently associated with a supporting and partitioned panel 30 which divides the washer compartment 12 from the driver control compartment 15.

A bulk-head or vertical partition member 31 has its lower edge secured to the horizontal support 30 and is further secured to the side walls 16 and 17 and to the upper cover 18 to provide a structural support for a dryer drum 32 which is mounted for rotation about a front to rear extending horizontal axis and which is mounted on the bulk-head 31 by such means as a self-centering bearing or journal 33. The front end of the dryer drum 32 is supported by a belt 34 carried by pulleys or the like 35.

The dryer drum is also provided with a perforated rear wall 36 having a multiplicity of apertures 37 therein for the ingress and egress of drying air which is supplied thereto through a first aperture 38 in the bulk-head 31 and which is exhausted therefrom through a second aperture 39 in the bulk-head 31.

High temperature hot air is supplied through the aperture 38 in the bulk-head 31 and through apertures 37 in the dryer drum 32 to dry clothes and the like tumbling in the dryer drum, as the drum is driven as hereinafter described in accordance with the principles of the present invention. This hot air is supplied from an air inlet duct or conduit 40 which is in registration with the inlet aperture 38 and which houses a heating device 41 which is herein shown as an electrical heating device by preference, but which may be a gas heater or other desired form of heater to heat air flowing through the conduit or duct 40. Air is forced through the conduit or duct 40 by a centrifugal blower or fan 42 disposed within a housing 43 forming an inlet end of the duct 40 integrally therewith. The fan 42 includes a plurality of impeller blades 44 and the like assembled on a shaft 45 which is rotatably and controllably driven to drive the impeller blades 44 to thereby draw air through an axial aperture 46 in the fan housing 43 and force the same through the duct 40 past the heater 41.

When the hot air is blown into the dryer drum 32 it circulates over the clothes and the like, tumbling therein, and picks up a moisture and usually some lint and the like therefrom, before it is exhausted from the dryer drum 32 through the apertures 37 and the perforated rear wall 36 and through the aperture 39 and the bulk-head 31. An exhaust duct or conduit 47 is mounted in registration with the exhaust aperture 39 in the bulk-head 31 and leads to a central or axial aperture 48 in an exhaust fan housing 49 in which there is mounted a plurality of fan impeller blades 50 assembled on a shaft 51 which is journaled to be driven in accordance with the principles of the present invention. When driven, however, the exhaust fan 52 including the impellers 50 mounted on the shaft 51 in the housing 49, exhausts the air from the dryer drum 32 and blows it out from the machine through an air cleaner or filter or the like 53, or such other device as decided. It will be noted, of course, that both the supply air fan housing 52 and the exhaust air fan housing 49 are preferably volute shaped to provide more efficient fan operation.

During a clothes washing operation utilizing the machine herein described, clothes or the like are deposited within the perforated extractor basket 29 within the tub 28 and they are there washed by the action of an agitator 54 which is mounted for oscillatory movement about a preferably vertical axis. After rinsing operations during which the agitator 54 is also power driven to oscillate about its preferably vertical axis, substantially all of the water is extracted from the clothes by high speed centrifugal action provided through high speed rotating driving of the perforated basket 29. To drive the agitator 54 and the basket 29 controllably and selectively, a drive control and transmission unit 55 is suspended from the plate 27 and is coupled to the agitator 54 through a shaft 56, and is further coupled to the basket 29 through a drive sleeve 57 which is preferably concentric and further rotatable with respect to the shaft 56. The transmission 55, herein diagrammatically shown, is preferably a transmission as set forth in detail in the United States Letters Patent No. 2,610,498, issued to P. E. Geldhof et al. on September 16, 1952.

From an understanding of the last mentioned patent it will be seen that the agitator 54 and the shaft 56 are coupled to an input drive shaft 58 through an appropriate agitator drive mechanism including a controllable clutch mechanism such as a solenoid operated clutch or the like. It will also be seen that the input drive shaft 58 for the transmission 55 has a pulley 59 or the like keyed thereto for co-rotation therewith and coupled to a second pulley 60 through a belt or the like 61. This second pulley 60 is preferably coaxial with the shaft 56 and sleeve 57 and is couplable with the sleeve 57 through an appropriate coupling mechanism including a second controllable clutch or the like which also may be a solenoid operated clutch. Further, the transmission 55 includes a timing and control mechanism for selective operation of the clutches so that when the input shaft 58 is power driven the washing and rinsing and extracting mechanism will be operated in accordance with a pre-selected cycle of operation, but which forms no part of the present invention and therefore will not be described in detail here.

In accordance with the principles of the present invention, the transmission drive shaft 58 is provided with a preferably vertical axis and has a worm-type gear 62 secured thereto to drive the shaft 58. The worm-type gear 62 is meshed with a second worm-type gear 63 which is keyed to a shaft 64 journaled in bearings 65 which are secured to the washer suspension plate 27. It will be understood, of course, that other types of coupling between the shafts 58 and 64 may be provided, such as bevel gears and the like, or other equivalent means, without departing from the true spirit and scope of the invention, but I have shown worm-type gears here by preference (note Fig. 3).

Further in accordance with the principles of the present invention all of the power driven sections, and devices included within the combined washer and dryer, are driven by a single prime mover power source such as an electric motor 66 which is mounted on the support 30 and fixedly secured thereto. The motor 66 has a shaft 67 which extends from the end valves 68 on each end of the motor and which carry bearings in which the shaft 67 is journaled.

One end of the shaft 67, and herein by preference the rearward end thereof, carries a pulley or the like 69 fixed thereto for co-rotation therewith when the motor is energized to drive the shaft 67. A belt 70 or other equivalent coupling means couples the pulley 69 to a pulley 71 which is fixed to the shaft 64 to drive the same when the motor 66 drives the pulley 69. In this manner of coupling energization of the motor 66 will provide power to the washer unit 11 through the transmission 55 and through the shaft 64 coupled to the transmission through the gear arrangement therebetween.

Timing controls and the like are otherwise provided to control the drive through the transmission 55 and thus operate to control the transmission to oscillate the agitator 54 or drive the extractor basket 29 or to stop movement of both of those members in the normally desired manner.

To drive the dryer drum 32 and the fans 42 and 52, however, the forward end of the shaft 67 is preferably connected to one side of a clutch mechanism 72, the other side of which carries a shaft 73 which has a pulley or the like 74 secured thereto for co-rotation therewith and which is selectively controllable for coupling and decoupling the shafts 67 and 73 where it is desired to operate the dryer and to cease its operation. The clutch mechanism 72 may be a solenoid operated clutch or the like whereby automatic control and timing control of the same may be conveniently provided. A belt or the like 75 couples the pulley 74 to a relatively large diameter pulley 76 secured to the shaft 45 on the input fan 42, and to a pulley 77 on the shaft 51 of the exhaust fan 52. Thus, when the motor 66 is energized and the clutch 72 is closed, power will be provided through the belt 75 coupling the pulleys 74, 76 and 77 to drive the fans 42 and 52 to supply air to the dryer and to exhaust the same therefrom in the desired manner.

A relatively small diameter pulley 78 is also in fixed association with the shaft 45 and is coupled to the dryer drum 32 by a belt or the like 79 so that rotatable driving of the shaft 45 is operative to rotate the dryer drum 32 and tumble clothes and the like therein. Through the utilization of a small pulley 78 on the shaft 45 co-rotating with a large pulley 76 on the same shaft and utilizing the small pulley for coupling to the dryer drum 32 with the large pulley 76 coupled to the driving motor 66 through a selectively controllable clutch or the like 72, there is effected a speed reduction in the driving of the dryer drum or cylinder 32.

Thus, in accordance with the principles of the present invention a combined washing and drying machine is provided with a most efficient form of single unit power driving of both the washing and rinsing and extracting mechanism and the drying mechanism including the rotatable dryer drum and the air supply and exhaust fans assembled therewith. Further, through the utilization of the present invention each of the units is selectively controllably operable so that the washer and dryer may be used simultaneously or independently and selectively as desired and each will be provided with a most efficient combination drive. To this end the clutch 72 as well as the clutches within the transmission 55 may all be controlled by control switch and dial members or the like 80 directly mounted on the front of the control compartment 15 or at any other desired location which may be on the machine or at some remote control station as desired.

It will further be observed that numerous variations and modifications may be effected without departing from the true spirit and scope of the novel concepts and principles of my invention. I, therefore, intend to cover all such modifications and variations as fall within the true spirit and scope of the novel concepts and the principles of my invention.

I claim as my invention:

1. In a combined washer and dryer for washing fabric materials and the like having a washing mechanism and a distinct drying mechanism which is a separate entity substantially independent of the washing mechanism and in joint assembly and an air fan operatively associated with the drying mechanism to circulate air through the drying mechanism, means directly coupling the drying mechanism to said fan, a single motor means, controllable coupling and decoupling means interconnecting said motor means and said fan to drive said fan and said drying mechanism simultaneously, and further means coupling said motor means to said washing mechanism to operate both of said mechanisms jointly and selectively respectively.

2. In a combined washer and dryer for washing fabric materials and the like having a washing mechanism and a drying mechanism in joint assembly and an air supply fan and an air exhaust fan operatively associated with the drying mechanism to supply air to the drying mechanism and to exhaust air therefrom respectively, each of said fans having a shaft, and said drying mechanism having a rotatable drum, means coupling said dryer drum to a shaft of one of said fans, a single motor source of rotary power, a clutch mechanism connected to said motor, means coupling said clutch to the shafts of said fans to drive the same and to drive said dryer drum at a reduced speed, and further means coupling said motor to said washing mechanism to drive the same selectively and jointly with the dryer drum and the fans.

3. In a combined washer and dryer for washing fabric materials and the like, a washing mechanism having an agitator and a basket, a transmission device coupled to said agitator and said basket, a single motor operative as a single source of rotary power, pulley and belt and gear means coupling said motor to said transmission to selectively drive said agitator and said basket, a dryer mechanism having a dryer drum rotatably mounted therein, an air fan operatively associated with said dryer drum, a clutch coupled to said motor, pulley and belt means coupling said fan to said clutch, and further pulley and belt means coupling said fan to said dryer drum.

4. In a combined washer and dryer for washing fabric materials and the like, a washing mechanism having an agitator and a basket, a transmission device coupled to said agitator and said basket, a single motor operative as a single source of rotary power, pulley and belt and gear means coupling said motor to said transmission to selectively drive said agitator and said basket, a dryer mechanism having a dryer drum rotatably mounted therein, an air fan operatively associated with said dryer drum, a clutch coupled to said motor, pulley and belt means coupling said fan to said clutch, and further pulley and belt means coupling said fan to said dryer drum, said pulley and belt means coupling said clutch to said fan including a large pulley on said fan and said pulley and belt means coupling said fan to said dryer drum including a smaller pulley on said fan to drive said dryer drum at a reduced speed.

5. In a combined washer and dryer for washing fabric materials and the like, a washing mechanism having a rotatable basket and an oscillatable agitator disposed within a tub, a support plate carrying said tub in resilient suspension, a transmission suspended from said plate, a shaft extending from said transmission, a second shaft journaled on said plate, gear means coupling said second shaft to said shaft extending from said transmission, a single motor source of rotary power, a pulley on said second shaft and a pulley on said motor, a belt coupling said pulleys to drive said transmission through said shaft and said gear means to selectively operate said basket and said agitator, a dryer mechanism having a rotatably mounted dryer drum, an air supply fan and an air exhaust fan operatively associated with said dryer mechanism, each of said fans having a shaft, the first and second pulleys of different diameters on the shaft of one of said fans, another pulley on the shaft of the other of said fans, a clutch connected to said motor, a pulley on said clutch, a belt coupling said pulley on said clutch to the pulley on the other of said fans and the larger pulley of said one of said fans, and a belt coupling said dryer drum to the smaller pulley on said shaft of said one of said fans.

6. In a combined washer and dryer for washing fabrics or the like comprising a washing mechanism including a container for washing liquid, a drying mechanism including a drum adapted to be rotated about a horizontal axis for tumbling fabrics therein, a single motor source of rotary power, a cabinet supporting the washing mechanism, drying mechanism and motor in different locations adjacent the back of the cabinet, air duct means located between the back of the drum and the cabinet back for circulating air through the dryer drum, a fan in the duct means having a drive shaft displaced from the dryer drum and extending forward beside the drum, and power transmission means between the motor and fan shaft laterally of the drum whereby the drum may be positioned adjacent the back of the cabinet without interference with the fan drive and motor.

7. In a combined washer and dryer for washing fabrics or the like comprising a washing mechanism including a container for washing liquid, a drying mechanism including a drum adapted to be rotated about a horizontal axis for tumbling fabrics therein, a single motor source of rotary power, a cabinet supporting the washing mechanism, drying mechanism and motor in different locations adjacent the back of the cabinet, air duct means located between the back of the drum and the cabinet back for circulating air through the dryer drum, a fan in the duct means having a drive shaft displaced from the dryer drum and extending forward beside the drum, power transmission means between the motor and fan shaft laterally of the drum whereby the drum may be positioned adjacent the back of the cabinet without interference with the fan drive and motor, and a drive belt means in driving relationship between the motor and the drum and passing over the drum intermediate its ends whereby a drive from the motor is provided in its location lateral of the drum.

References Cited in the file of this patent

UNITED STATES PATENTS

| | | |
|---|---|---|
| 1,629,391 | Kamp et al. | May 17, 1927 |
| 1,666,917 | Sargent | Apr. 24, 1928 |
| 2,099,163 | Frantz et al. | Nov. 16, 1937 |
| 2,200,175 | Kaestner | May 7, 1940 |
| 2,521,159 | Geldhof et al. | Sept. 5, 1950 |
| 2,566,488 | Gould | Sept. 4, 1951 |
| 2,607,209 | Constantine | Aug. 19, 1952 |
| 2,652,708 | Rimsha et al. | Sept. 22, 1953 |
| 2,668,432 | Emmert | Feb. 9, 1954 |
| 2,724,905 | Zerbach | Nov. 29, 1955 |
| 2,729,336 | Swartz | Jan. 3, 1956 |
| 2,776,826 | Bennett et al. | Jan. 8, 1957 |